(12) United States Patent
Beman et al.

(10) Patent No.: US 8,543,449 B2
(45) Date of Patent: Sep. 24, 2013

(54) SYSTEM AND METHOD FOR ESTIMATING AVAILABLE PAYLOAD INVENTORY

(75) Inventors: Jeffery C. Beman, Redmond, WA (US); Alan S. Geller, Redmond, WA (US); Ashis K. Roy, Redmond, WA (US); Lawrence A. Koch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2527 days.

(21) Appl. No.: 09/943,609

(22) Filed: Aug. 29, 2001

(65) Prior Publication Data

US 2003/0046139 A1    Mar. 6, 2003

(51) Int. Cl.
*G06Q 30/00* (2012.01)

(52) U.S. Cl.
USPC .......................................... 705/14.1

(58) Field of Classification Search
USPC .................................. 705/14, 14.1
See application file for complete search history.

(56) References Cited

U.S. PATENT DOCUMENTS

| | | | | |
|---|---|---|---|---|
| 6,466,970 | B1 * | 10/2002 | Lee et al. | 709/217 |
| 6,654,725 | B1 * | 11/2003 | Langheinrich et al. | 705/14 |
| 6,879,994 | B1 * | 4/2005 | Matsliach et al. | 709/204 |
| 2002/0042821 | A1 * | 4/2002 | Muret et al. | 709/223 |
| 2002/0128904 | A1 * | 9/2002 | Carruthers et al. | 705/14 |
| 2005/0246231 | A1 * | 11/2005 | Shkedi | 705/14 |

FOREIGN PATENT DOCUMENTS

WO  WO 01/01318  * 1/2006

* cited by examiner

*Primary Examiner* — Daniel Lastra
(74) *Attorney, Agent, or Firm* — Shook, Hardy & Bacon L.L.P.

(57) ABSTRACT

A system and method for estimating available payload inventory are provided. An advertisement delivery system generates a set of atomic market segment arrays from target market criteria for one or more advertisement campaigns to be served. The set of arrays is incremented corresponding to advertisement requests matching the target market criteria. The atomic market segment is processed to select an advertisement and to predict future capacity and manage inventory.

44 Claims, 13 Drawing Sheets

SYSTEM AND METHOD FOR ESTIMATING AVAILABLE PAYLOAD INVENTORY

FIELD OF THE INVENTION

In general, the present application relates to computer software, and in particular, to a system and method for estimating available payload inventory by tracking atomic market segments.

BACKGROUND OF THE INVENTION

Generally described, multi-person networks, such as the Internet, facilitate the interaction of computer users and the exchange of a variety of information. More specifically, the Internet has recently seen explosive growth by virtue of its ability to link computers located throughout the world. As the Internet has grown, so has the World Wide Web ("WWW" or "Web"). The Web is a vast collection of interconnected or "hypertext" documents in HyperText Markup Language ("HTML") that are electronically served at "Web sites" throughout the Internet.

The Web has quickly become a popular method of disseminating information due in large part to its simplicity and its ability to deliver information in a variety of formats. To make information available over the Web, a user typically composes a set of "Web pages" which are posted on a Web site by an Internet Service Provider ("ISP"). A Web site resides on a server connected to the Internet that has mass storage facilities for storing hypertext documents, a.k.a. "Web pages," and that runs administrative software for handling requests for those stored hypertext documents. A hypertext document normally includes a number of hyperlinks, i.e., highlighted portions of text which link the document to another hypertext document possibly stored at a Web site elsewhere on the Internet. Each hyperlink is associated with a Uniform Resource Locator ("URL") that provides the exact location of the linked document on a server connected to the Internet and describes the document. Thus, whenever a hypertext document is retrieved from any Web server, the document is considered to be retrieved from the Web.

A user is allowed to retrieve hypertext documents from the Web, i.e., a user is allowed to "surf the Web," via a Web browser. A Web browser, such as NETSCAPE NAVIGATOR®, MICROSOFT®, Internet Explorer or phone.com's UP.link microbrowser, is a software program implemented by a Web client, e.g., the user's computer, cell phone or other client device, to provide a graphical user interface ("GUI") to the Web. Upon request from the user via the Web browser, the Web client accesses and retrieves the desired hypertext document from the appropriate Web server using the URL for the document and a protocol known as HyperText Transfer Protocol ("HTTP"). HTTP is a higher-level protocol than TCP/IP and is designed specifically for the requirements of the Web. It is used on top of TCP/IP to transfer hypertext documents between servers and clients.

Often, a Web site provider is able to provide content, and or services, to computer users at a reduced cost, or even free, by generating advertisement revenue from one or more advertisement providers. For example, a merchant can contract with a Web site provider to pay the Web site provider to display the merchant's advertisements along with the Web site content. The contracting merchant can be generally referred to as an advertisement provider. With regard to Web sites that are accessed by a large number of users, such as a portal Web site, the Web site provider may contract with a number of advertisements providers to display an advertisement a certain number of times over a given time period, generally referred to as an advertisement campaign. Additionally, each advertisement provider may also include criteria, such as a "male, age=30 to 35," that limits to whom the advertisement may be displayed. In such an embodiment, the Web site provider utilizes one or more criteria, such as user demographics and/or inputted keywords, obtained from the content requesting user to select an appropriate advertisement from a group of applicable advertisements. The satisfaction of advertisement provider criteria is generally referred to as a display opportunity.

In order to accommodate for large number of users requesting content and thereby requiring one or more advertisements, some Web site providers utilize an advertisement delivery system to track and deliver advertisements to the Web site provider. Often, the advertisement delivery system negotiates with various advertisement providers such that the advertisement delivery system may have to concurrently process several advertisement campaigns. Accordingly, a primary focus of the advertisement delivery system relates to the selection of an advertisement from a variety of potentially applicable advertisements so as to better comply with the contractual obligations of the current advertisement campaigns. For example, an advertisement delivery system may implement a smooth advertisement delivery system and method to better accommodate for variations in the number of display opportunities. A smooth advertisement delivery system and method may be implemented as disclosed in commonly-owned U.S. patent application Ser. No. 09/773,449, filed Jan. 31, 2001, the disclosure of which is hereby incorporated by reference.

In addition to the selection of advertisements to satisfy current advertisement campaigns, another primary focus of an advertisement delivery system relates to future display opportunity processing. In a capacity planning aspect, the advertisement delivery system utilizes an estimated number of future display opportunities to ensure that the advertisement delivery system has adequate system resources in terms of memory, processing capability, personnel to satisfy future advertisement delivery system obligations. In an available inventory aspect, the advertisement delivery system utilizes the estimated number of future display opportunities to maximize the amount of revenue that can be generated by the sale of all, or substantially all, the estimated future display opportunities.

Several advertisement delivery systems attempt to address issues relating to future display opportunities by sampling a certain percentage of current display opportunities and interpolating the sampled data to calculate future display opportunities. In accordance with this embodiment, an advertisement delivery system samples a selected percentage of the user requests for advertisements. The sampled request criteria are stored and are then statistically interpolated to predict future display opportunities. For example, a sampling of 100,000 advertisement requests at a sampling rate of 1 user request out of every 1000 user requests would generate 100 data points. If the sampled user requests produce data indicative of 10 user requests including the selection criteria "gender=male" and "age=30 to 35," then the conventional advertisement delivery system would assume that 10% of all the user requests would include those user request criteria. Accordingly, if 1,000,000 advertisement requests were predicted for the following day, the conventional advertisement delivery system would assume that 100,000 of the requests would contain the selection criteria "gender=male" and "age=30 to 35" and would attempt to sell a sufficient number of advertisements that could be satisfied by the criteria.

Conventional sampling methods, however, can become deficient for smaller volume advertisement campaigns that have more specific user request criteria to match. For example, assume that an advertisement campaign requires that a particular set of criteria must be matched before the advertisement can be displayed and that the particular set of criteria is only appears 500 times over 350,000 user requests. Utilizing a sampling method, it would be very likely that an advertisement delivery system would detect few, if any, of the user requests satisfying the particular set of criteria. Accordingly, the conventional advertisement delivery system would incorrectly estimate the available inventory and potentially lose a portion of its revenue generating stream. Moreover, conventional sampling methods would also discourage selling smaller advertisement campaigns, as there would be little way of monitoring the performance of the advertisement delivery system.

In addition to the problems associated with smaller advertisement campaigns, a conventional sampling method may also become deficient with regard to the scalability of the advertisement delivery system. Under the conventional sampling method, the user request criteria is collected and stored for future interpolation. However, as the number of user requests increases, the amount of user request data collected and stored can impede the advertisement delivery memory and processing resources. With reference to the above example, a 1 in 1000 sampling rate yields 100 data points for 100,000 user requests. However, in larger advertisement delivery systems responding to 35,000,000 advertisement requests, the same sampling rate would yield 35,000 data points. Accordingly, the advertisement delivery system must select between reducing the data being collected and stored by increasing the sampling rate and diminishing the accuracy associated with increase sampling rate.

Conventional sampling advertisement delivery systems can also become deficient in relation to overlapping market segments. Generally described, an overlapping market segment involves the competition between two advertisement campaigns for a user request. For example, assume a user request contains the criteria "gender=male" and "age=30 to 35." If an advertisement campaign targets "gender=male" and another, unrelated advertisement campaign targets "age=30 to 35," an advertisement delivery could select either an advertisement from either of the two advertisement campaigns, but not both. Under a sampling method, the advertisement delivery system interpolation generally does not account for overlapping market segments, resulting in errors of predicted future display opportunity inventory.

Thus, there is a need for a system and method for more accurately and efficiently tracking and predicting advertisement display opportunities.

SUMMARY OF THE INVENTION

A system and method for estimating available payload inventory are provided. An advertisement delivery system generates one or more atomic market segment arrays from target market criteria for one or more advertisement campaigns to be served. The set of arrays is incremented corresponding to advertisement requests matching the target market criteria. The atomic market segment is processed to select an advertisement and to predict future capacity and manage inventory.

In accordance with an aspect of the present invention, a method for processing payload requests is provided. A payload processing application obtains a set of criteria including one or more criterion for at least one payload. The payload processing application generates a set of arrays corresponding to each criterion in the set of criteria. The set of arrays includes a plurality of array elements corresponding to periods of time. The payload processing application then obtains a payload request including a set of request criteria. Each payload request is associated with a time that the payload request is received by the payload processing application. The payload processing application increments a numerical identifier in the set of arrays corresponding to the request criterion and the time the payload request was received.

In accordance with another aspect of the present invention, a system for processing payload requests is provided. The payload requests are associated with a set of payload criteria having one or more criterion. The system includes a payload processor operable to obtain the payload criteria and to generate a set of arrays corresponding to each criterion in the set of payload criteria. The set of arrays includes a plurality of array elements that are representative of periods of time. The payload processor is further operable to obtain a set of payload request criteria and increment a numerical identifier in an array matching the set of payload request criteria. The incremented numerical identifier corresponds to an array element representative of a time the payload request was obtained by the payload processor. The system further includes a payload manager operable to obtain the set of arrays and process data associated with the set of arrays.

In accordance with a further aspect of the present invention, a computer-readable medium having computer-executable components for processing payload requests is provided. The computer-readable medium includes a payload processing component operable to obtain payload criteria having one or more criterion corresponding to a payload request. The payload processing component is also operable to generate a set of arrays corresponding to each criterion in the set of payload criteria. The set of arrays includes a plurality of array elements corresponding to periods of time. The payload processing component is further operable to obtain a set of payload request criteria and increment a numerical identifier in the set of arrays corresponding to a time the payload request was obtained. The computer-readable medium also includes a payload manager operable to obtain the set of arrays and process data within the set of arrays.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 13:
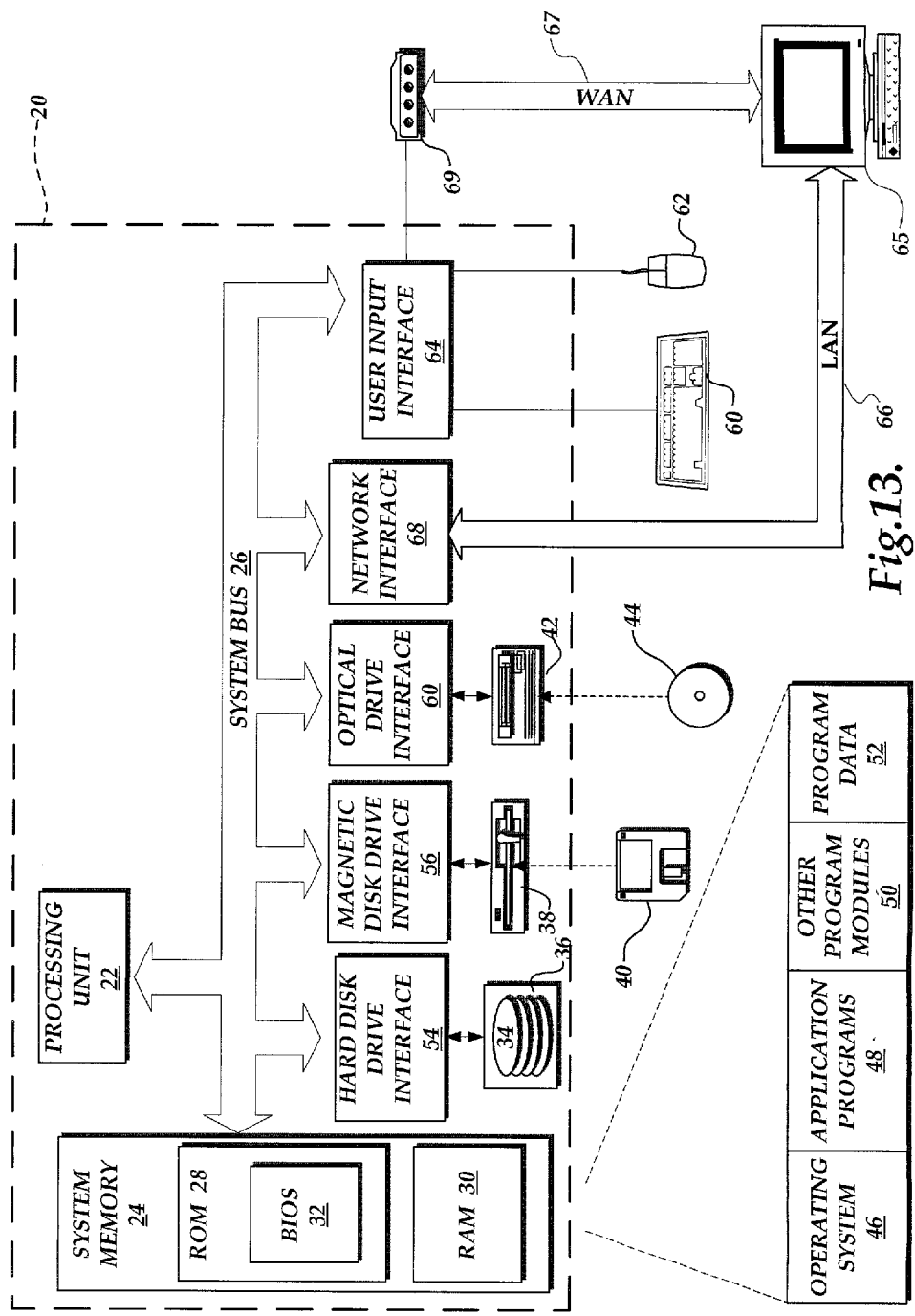
FIG. 13 is a block diagram of a computer system suitable for implementing the present invention.

FIG. 13 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purpose or special computing system environments or configurations. Example of well known computing systems, environments, and/or configurations that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 13, an exemplary system for implementing the invention includes a general purpose computing device in the form of a computer 20. Components of a computer 20 include, but are not limited to, a processing unit 22, a system memory 24, and a system bus 26 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 13 illustrates an operating system 46, application programs 48, other program modules 50, and program data 52.

The computer 20 may also include removable/non-removable, volatile/non-volatile computer storage media. By way of example only, FIG. 13 illustrates a hard disk drive 36 that reads from or writes to non-removable, non-volatile magnetic media 38, a magnetic drive 38 that reads from or writes to a removable, non-volatile magnetic disk 40, and an optical disk drive 42 that reads from or writes to a removal, non-volatile optical disk 44, such as CD-ROM or other optical media.

Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 26 by a hard disk drive interface 54, a magnetic disk drive interface 56, and an optical drive interface 58, respectively. Alternatively, the hard disk drive 34, magnetic disk drive 38, and optical disk drive 42 are typically connected to the system bus 26 by a Small Computer System Interface (SCSI).

The drives and their associate computer storage media discussed above and illustrated in FIG. 13, provide storage of computer-readable instructions, data structures, program modules and other data for the computer 20. In FIG. 13, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 13. The logical connections depicted in FIG. 13 include a local area network (LAN) 66 and a wide area network (WAN) 67, but also include other networks. Such network environments are commonplace in office, enterprise-wide computer networks, intranets, and the Internet.

When used in a LAN network environment, the computer 20 is connected to the LAN 66 through a network interface adapter 68. When used in a WAN network environment, the computer typically includes a modem or other means for establishing communications over the WAN 68, such as the Internet. The modem, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 13 illustrates remote application programs 48 as residing on memory device 24. It will be appreciated that the network connections shown are exemplary in other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM instructs the processing unit 22 to loan the operating system from the hard disk drive 34 into the RAM 30. Once the operating system 46 is loaded into RAM 30, the processing unit executes the operating system code and causes the visual elements associated with the user interface of the operating system to be displayed on the monitor 61. When an application program 48 is opened by a user, the program code and relevant data are read from the hard disk drive and stored in RAM 38.

As is appreciated by those skilled in the art, the World Wide Web (WWW) is a vast collection of interconnected or "hypertext" documents written in HyperText Markup Language (HTML) or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks that may be identified in various way (e.g., highlighted portions of text) which link the document to other hypertext documents possibly stored at a WWW site elsewhere on the Internet. Each hyperlink is associated with a Uniform Resource Locator (URL) and provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs written in the JAVA™ programming language from Sun Microsystems, for execution on a remote computer. Likewise WWW server may also include facilities for executing scripts or other application programs on the WWW server itself.

A consumer or other remote user may retrieve hypertext documents from the WWW via a WWW browser application program. The WWW browser is a software application program for providing a graphical user interface to the WWW. Upon request from the consumer via the WWW browser, the browser accesses and retrieves the desired hypertext document from the appropriate WWW server using the URL for the document and a protocol known as a HyperText Transfer Protocol (HTTP). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA™ applets, for execution on the client computer.

The present invention relates to a system and method for estimating available payload inventory. In accordance with an actual embodiment, the present invention will be described in relation to a system and method for processing user request criteria to estimate advertisement display opportunity inventory. As will be readily understood by one skilled in the relevant art, the present invention is not limited to its application to an advertisement media delivery system and the embodiments disclosed are only done by way of example and should not be construed as limiting.

Figure 1:
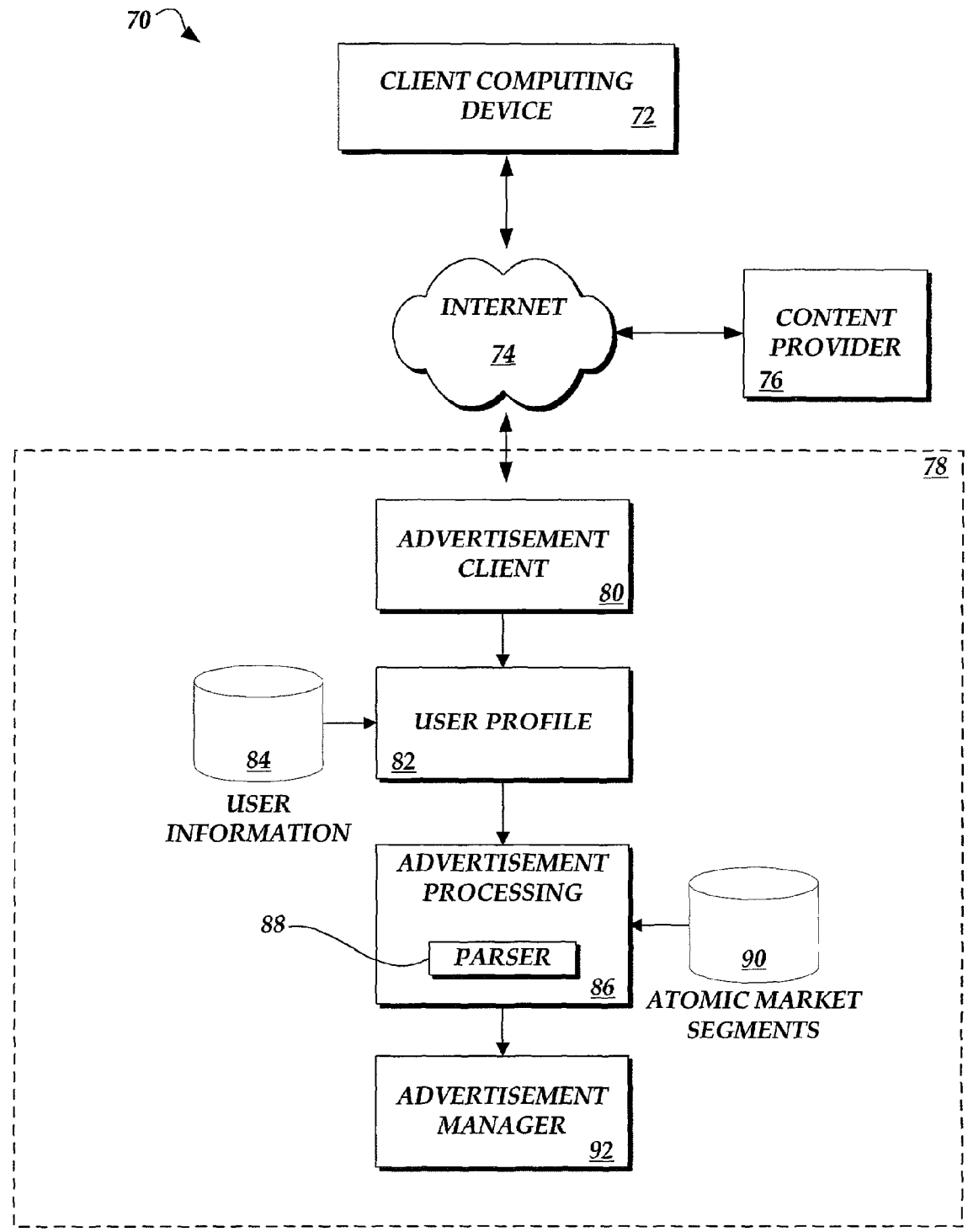
FIG. 1 is a block diagram illustrative of a content and advertisement delivery system operable to process the user request criteria to estimate advertisement display opportunity inventory in accordance with the present invention.

FIG. 1 is a block diagram illustrative of a content and advertisement delivery system 70 operable to process the user request criteria to estimate advertisement display opportunity inventory in accordance with the present invention. As illustrated in FIG. 1, the content and advertisement delivery system 70 includes one or more client computing devices 72 that are connected to the Internet 74. In an illustrative embodiment of the present invention, the client computing devices 72 may be connected to the Internet 74 via an ISP (not shown). Alternatively, the client computing devices 72 may be connected directly to the Internet 74. The client computing devices 72 may have a browser software application that requests content from one or more content providers 76 via the Internet 74. Although only one client computing device 72 and content provider 76 are illustrated in FIG. 1, one skilled in the relevant art will appreciate that the content and advertisement delivery system 70 may include any number of client computing devices 72 and content providers 76.

In addition to providing the requested content to the client computing device 72, the content provider 76 may also issue a request to an advertisement delivery system 78 for one or more advertisements that correspond to the requested content and/or one or more user demographics with the user associated with the client computing device 72. As illustrated in FIG. 1, the advertisement delivery system 78 includes an advertisement client component 80 operable to receive the request for advertisements. The advertisement delivery system 78 also includes a user profile component 82 operable to obtain one or more user identifiers and associate them with one or more records of a user information store 84.

With continued reference to FIG. 1, the advertisement delivery system 78 further includes an advertisement processing component 86 that is operable to obtain user request criteria and user information, select an advertisement for return to the content provider 76 and parse the selected advertisement's target information for future inventory processing. The advertisement processing component 86 can include a parser 88 for processing the advertisement's target data. In communication with the advertisement processing component 86 is an atomic market segment store 90 operable to store a number of atomic market segments for tracking advertisement requests. A more detailed description of an atomic market segment will be described below. The advertisement delivery system 78 also includes an advertisement manager component 92 operable to obtain the atomic market segment data and utilize the data for capacity planning and inventory management. One skilled in the relevant art will appreciate that the advertisement delivery system 78 may include additional or alternative components and/or that one or more of the components may perform additional functions.

Figure 2:
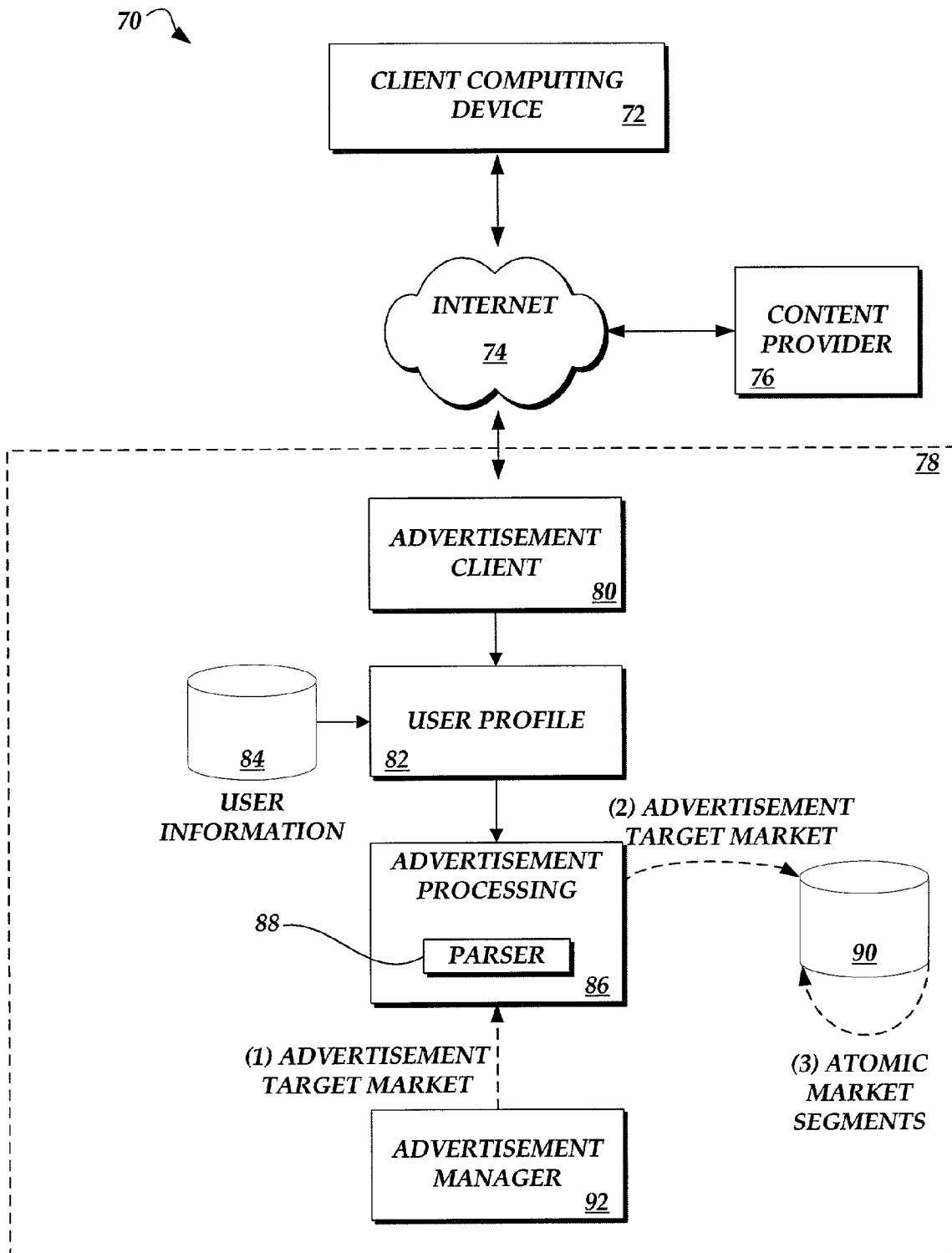
FIG. 2 is a block diagram of the advertisement content and delivery system of FIG. 1 illustrating the generation of atomic market segment arrays from the advertisement campaigns in accordance with the present invention.

FIG. 2 is a block diagram of the advertisement content and delivery system 78 of FIG. 1 illustrating the generation of atomic market segment arrays from the advertisement campaigns in accordance with the present invention. The process can be initiated when the advertisement manager component 92 of the advertisement delivery system 78 transfers target market segment criteria for one or more advertisement campaigns to the advertisement processing component 86. The parser 88 obtains the target market segment criteria and generates an ordered list of the individual criterion within the target market segment criteria. The advertisement processing component 86 then transmits the ordered list of advertisement target market segment data to the atomic market segment store 90. The ordered list is stored in the atomic market segments store 90 as one or more atomic market segment arrays. As will be explained in greater detail below, the atomic market segment arrays stored in the atomic market segment store 90 can be utilized by the advertisement processing component 86, and other components, to track a number of incoming advertisement requests and to predict future capacity planning and inventory data.

Figure 3:
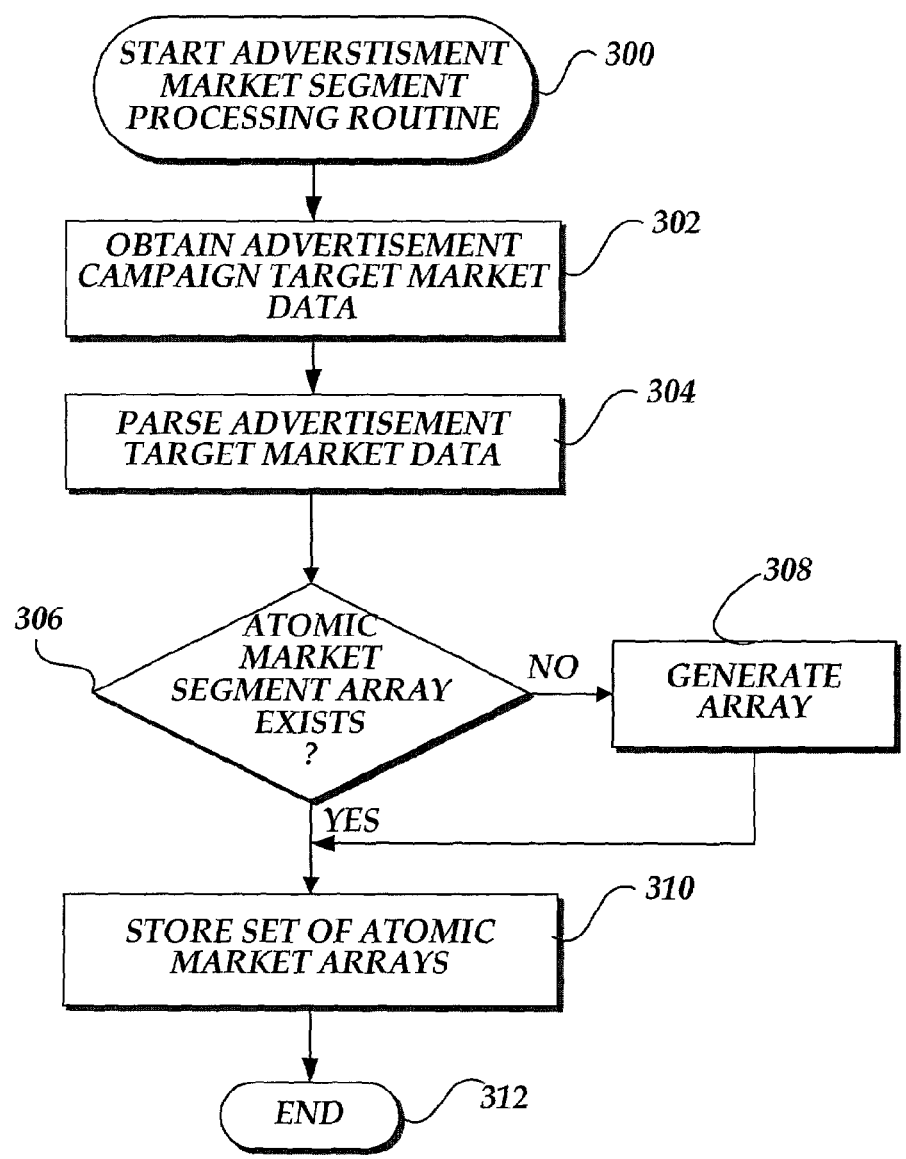
FIG. 3 is a flow diagram illustrative of an advertisement market segment processing routine performed by an advertisement delivery system in accordance with the present invention.

FIG. 3 is a flow diagram illustrative of an advertisement market segment processing routine 300 performed by an advertisement delivery system 78 in accordance with the present invention. At block 302, the advertisement processing component 86 of the advertisement delivery system 78 obtains one or more advertisement target market data (e.g., the data required to be present to select the advertisement) from the advertisement manager 92. At block 304, the parser 88 from the advertisement processing component 86 parses the advertisement request. In an illustrative embodiment of the present invention, the parser 88 parses the advertisement target market data into an ordered list of individual criterion. At decision block 306, a test is performed to determine whether an atomic market segment array exists for one or more of the parsed target market segment criterion. If one or more of the atomic market segment arrays do not exist, at block 308, the advertisement processing component 86 generates corresponding atomic market segment arrays. At block 310, the advertisement processing component 86 stores the atomic market segment arrays in the atomic market segment data store 90 and the routine 300 terminates at block 312.

Figure 4:
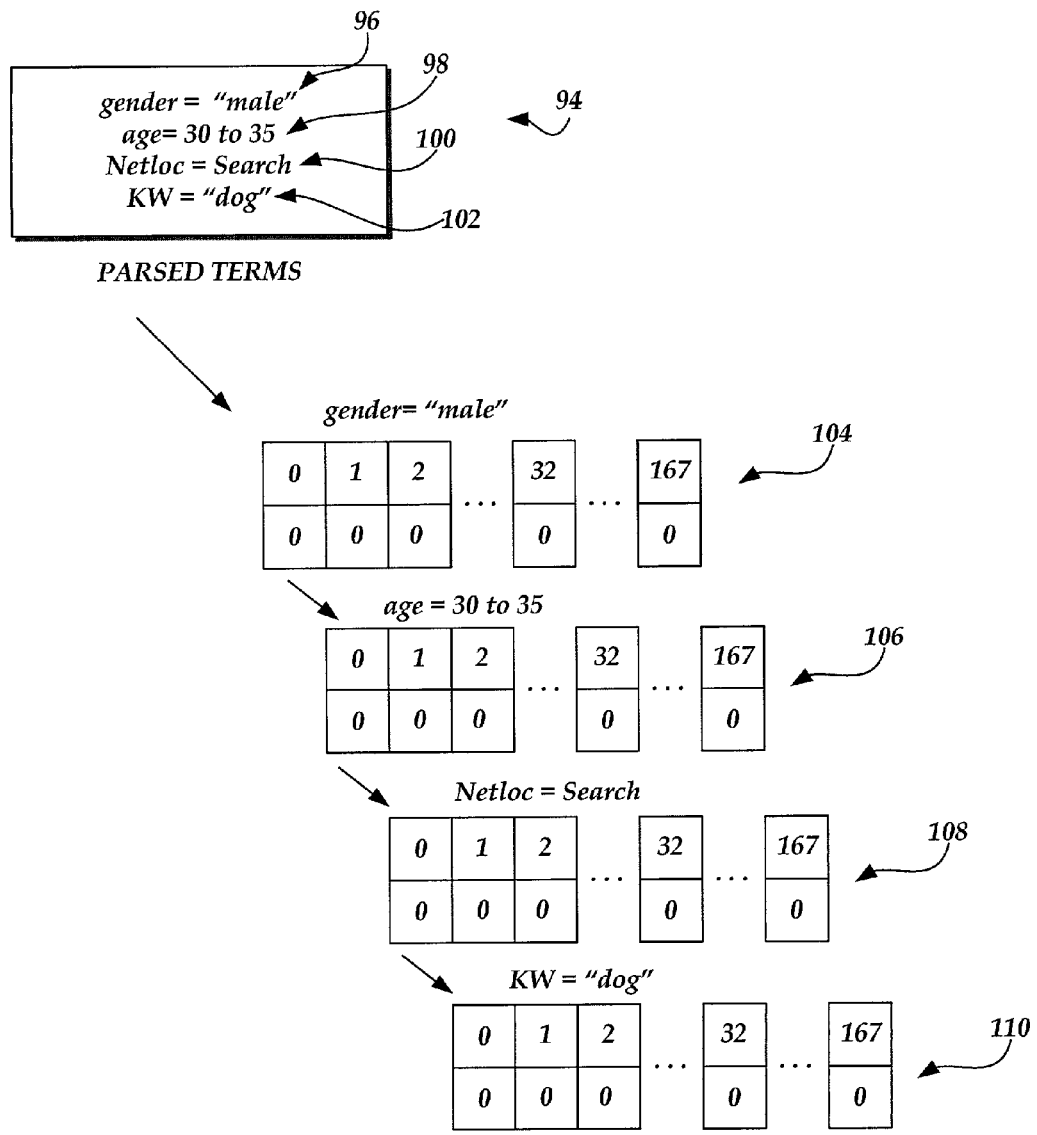
FIG. 4 is a block diagram illustrating the generation of one or more atomic market segment arrays corresponding to advertisement target market criteria in accordance with the present invention.

FIG. 4 is block diagram illustrative of the generation of a set of atomic market segment arrays corresponding to inputted advertisement target market segment criteria 94 in accordance with the present invention. In the illustrative example, the parsed advertisement target market segment criteria includes four criteria terms, namely, a "gender='male'" term 96, an "age=30 to 35" term 98, a "Netloc=Search" term 100 and a "KW='dog'" term 102 are required to be satisfied by inputted advertisement request criteria. In an actual embodiment of the present invention, the advertisement target market segment criteria terms define an available market for potential advertisements, such as the gender and age of the user associated with the client computing device 72, terms 96 and 98, the origin of the content request, term 100, and keywords entered by the user, term 102. In accordance with the present invention, the order of the received terms is maintained during the parsing of the advertisement target market segment criteria for processing. However, one skilled in the relevant art will appreciate that the advertisement delivery system 78 may process the order of the advertisement target market segment criteria in an alternative manner.

In accordance with the present invention, the advertisement processing component 86 generates one or more data arrays having elements representative of a time intervals, generally referred to as an atomic market segment array. Each atomic market segment array is associated with an advertisement request term (or related terms) and the data array elements are populated with numerical data indicative of the number of advertisement requests received matching the particular term, or group of terms, that the array represents. Additionally, the population of the array elements with numerical identifiers is structured such that each array element is representative of a time period in which the advertisement request criteria is received. In an actual embodiment of the present invention, each atomic market segment array includes 168 array elements (e.g., element 0-167), in which each array element is indicative of an hour of time. Thus, each array element is capable of monitoring 7 days worth of advertisement requests. One skilled in the relevant art will appreciate that variations to the number of array elements in the atomic market segment array or the time period which each array element is representative are considered to be within the scope of the present invention. Moreover, although individual term market segment arrays are illustrated in FIG. 4, the advertisement processing component 86 may also generate one or more atomic market segment arrays representative of a collection of search terms.

In actual embodiment of the present invention, the one or more atomic market segment arrays are linked according to the order of the parsed advertisement target market segment criteria. With reference to the illustrative example of FIG. 4, the first atomic market segment array 104 corresponds to the first advertisement target market segment criteria term 96, "gender='male.'" Similarly, the second atomic market segment array 106 corresponds to the second advertisement target market segment criteria term 98, "age=30 to 35," the third atomic market segment array 108 corresponds to the third advertisement target market segment criteria 100, and the fourth atomic market segment array 110 corresponds to the fourth advertisement target market segment criteria 100. As will be explained in greater detail below, the array elements of the atomic market segment arrays are now ready to be populated with processed advertisement request information.

Figure 5:
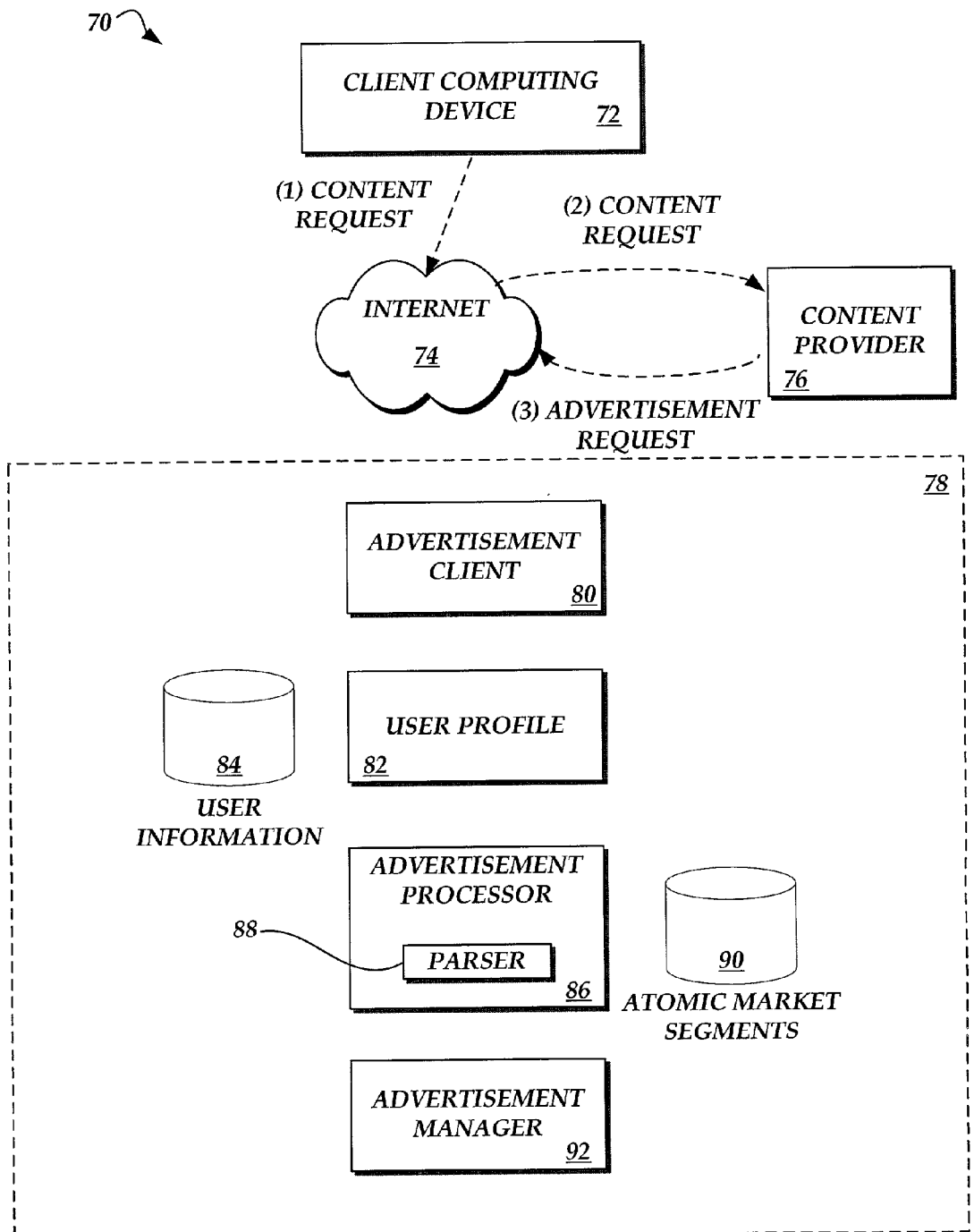
FIG. 5 is a block diagram of the content and advertisement delivery system of FIG. 1 illustrating the initiation of a user request in accordance with the present invention.

FIGS. 5-9 are block diagrams of the content and advertisement delivery system 70 illustrative of various stages of the processing of a content/advertisement request in accordance with the present invention. Referring to FIG. 5, the process can be initiated when a client computing device 72 generates a content request. In an illustrative embodiment of the present invention, the client computing device 72 may issue a request for content by submitting various information to a content provider. For example, a user associated with the client computing device may submit one or more keywords that relate to a content provider Web site to search for a particular subject matter. Additionally, the client computing device may also submit one or more identifiers, including user demographic information, computing device identifiers, etc., that are stored on the client computing device 72, such as in one or more cookies.

Figure 6:
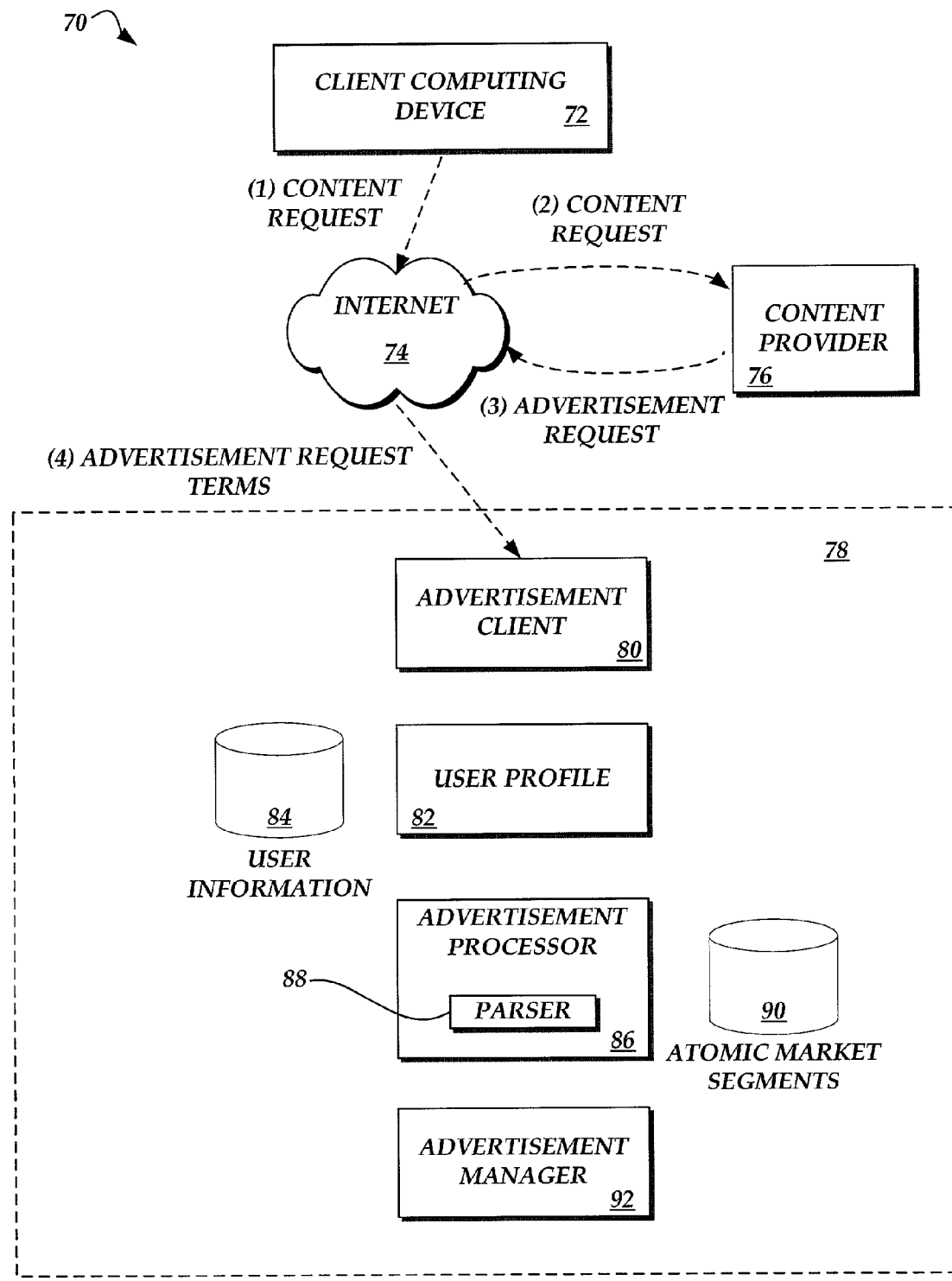
FIG. 6 is a block diagram of the content and advertisement delivery system of FIG. 1 illustrating the transfer of a request criteria and user identification information to an advertisement delivery system in accordance with the present invention.

Referring now to FIG. 6, the content provider 76 obtains the client computing device 72 content request and identifies the content corresponding to the request. Additionally, in accordance with the present invention, the content provider generates an advertisement request for one or more advertisements from an advertisement delivery system 78. In an illustrative embodiment of the present invention, the content provider 76 generates advertisement request information that can include the request terms submitted by client computing device 72 and one or more client computing identifiers. As illustrated in FIG. 6, the advertisement request information generated by the client computing device 72 and/or content provider 76 is obtained by the advertisement client component 80 of the advertisement delivery system 78.

Figure 7:
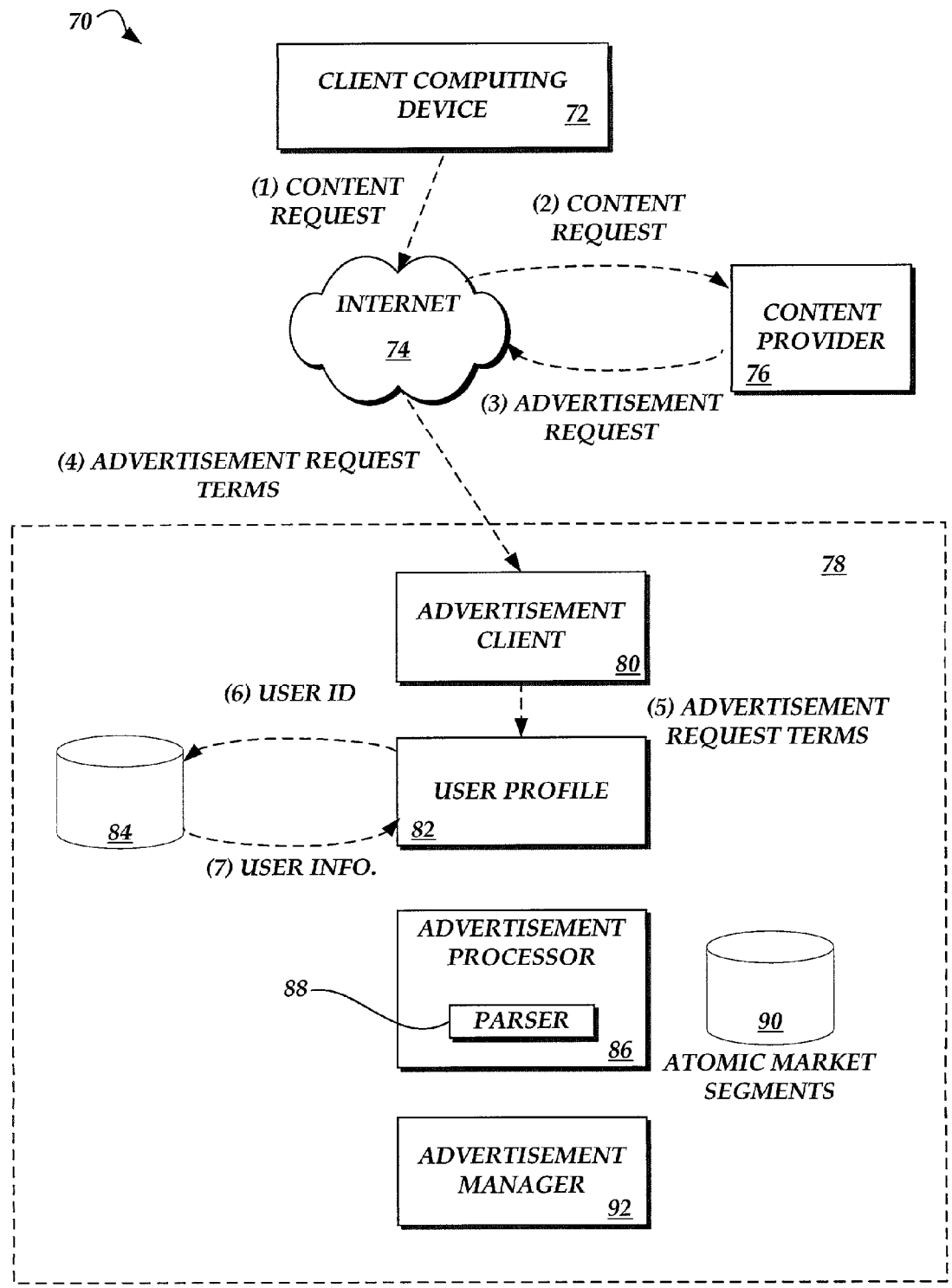
FIG. 7 is a block diagram of the content and advertisement delivery system of FIG. 1 illustrating the transfer of the request criteria and the user identification information to an advertisement delivery system to generate additional user demographic information in accordance with the present invention.

With reference to FIG. 7, the advertisement client component 80 transfers the advertisement request information to a user profile component 82 which can utilize one or more user identifiers within the advertisement request information to obtain additional user information from a user information store 84. For example, the advertisement request information may include a telephone number, address, name or other identifier that can be associated with one or more records from the user information store. The records from the user information store 84 can include more detailed information about a user associated with the client computing device and/or the client computing device itself. In an illustrative embodiment of the present invention, a user may provide a content provider 76 additional user information, such as user demographic information, that is forwarded to the advertisement delivery system 78 for use. Additionally, the user information may include one or more user preferences that will specify a preference for specific subject matter (e.g., sports in Seattle) and/or a preference not to receive advertisements for specific subject matter (e.g., adult material). Accordingly, the information from the user information store 84 is incorporated into the advertisement request information.

Figure 8:
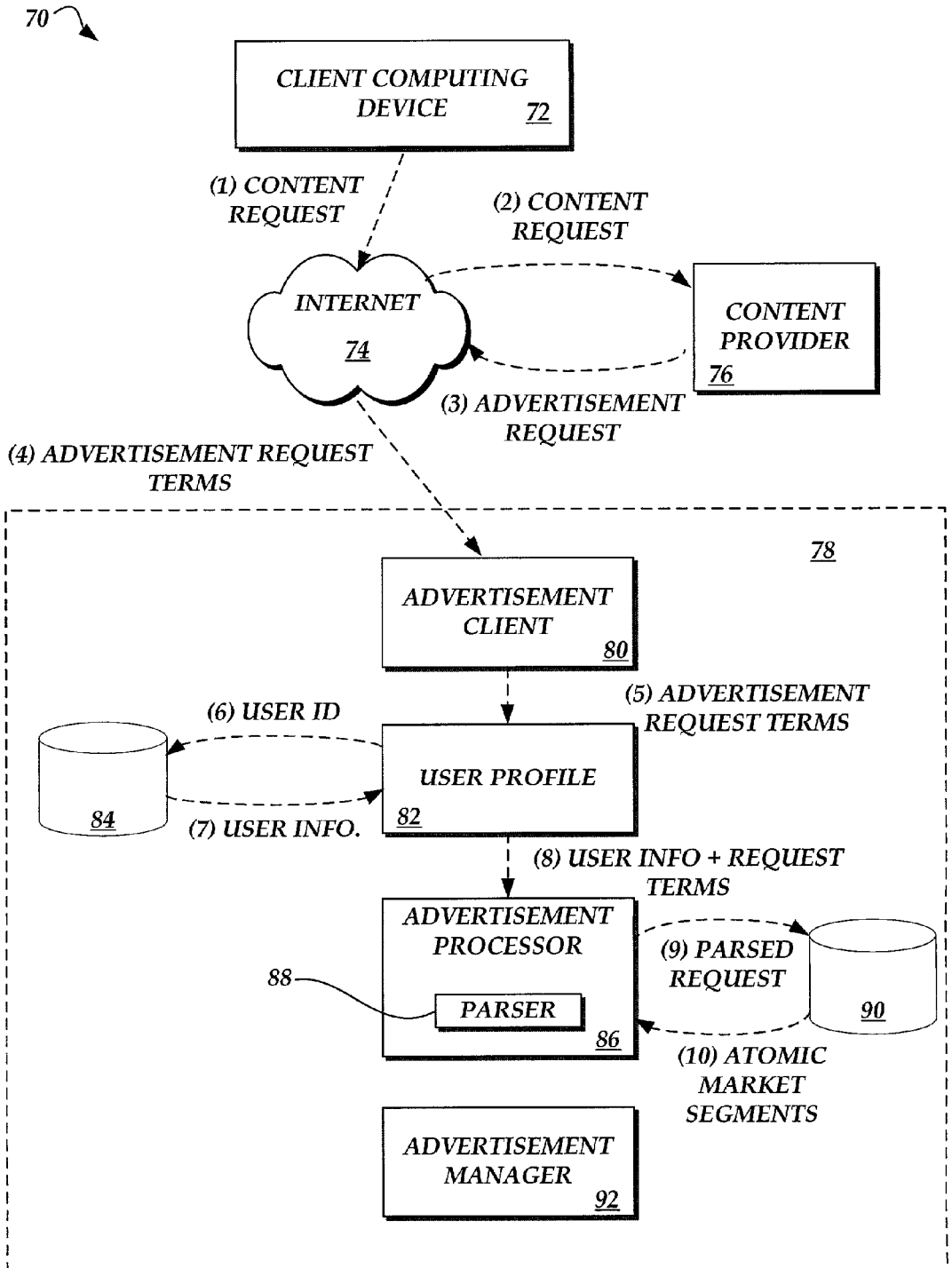
FIG. 8 is a block diagram of the content and advertisement delivery system of FIG. 1 illustrating the parsing of the user request criteria and the user demographic information by an advertisement delivery system in accordance with the present invention.

Referring now to FIG. 8, the user profile component 82 transfers the advertisement request information to an advertisement processing component 86 for processing. The advertisement processing component 86 parses the advertisement request information to identify advertisement request criteria to be matched. Additionally, the parsed advertisement request information will be utilized to populate the atomic market segment arrays previously generated by the advertisement processing component 86 for generating future estimate data. In an actual embodiment of the present invention, the selection of an applicable advertisement and the population of the atomic market segment array may be accomplished in a single process. Alternatively, the selection and population function may independent processes.

Figure 9:
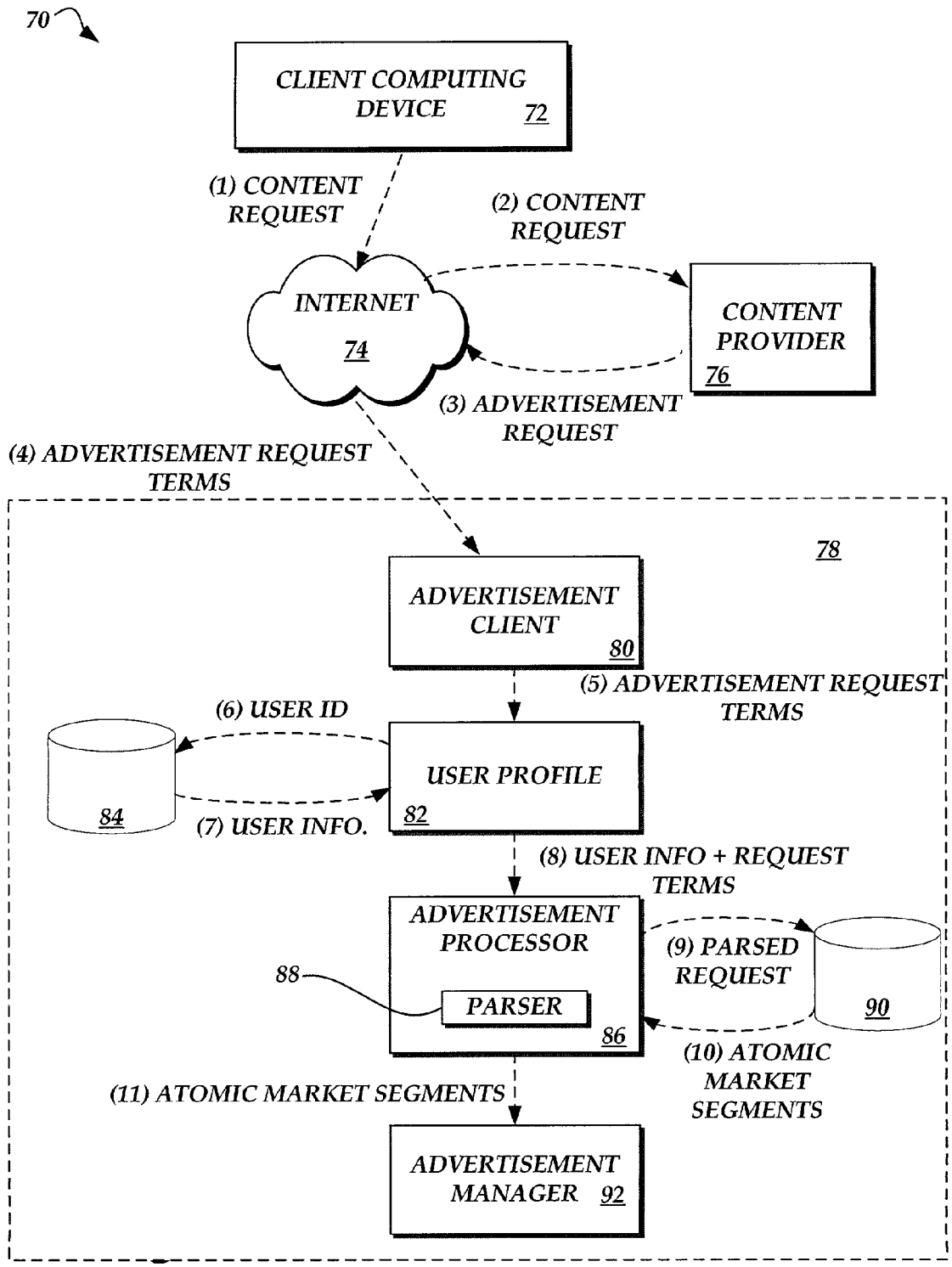
FIG. 9 is a block diagram of the content and advertisement delivery system of FIG. 1 illustrating the transfer of processed atomic market segment data to an advertisement manager in accordance with the present invention.

With reference to FIG. 9, the advertisement processing component 86 transfers the atomic market segment data to an advertisement manager component 92 for processing. In an actual embodiment of the present invention, the atomic market segment data is utilized to track current advertisement request data and predict future data. The advertisement manager component 92 may also utilize additional processing to account for overlapping market segments, which will be explained in greater detail below.

Figure 10:
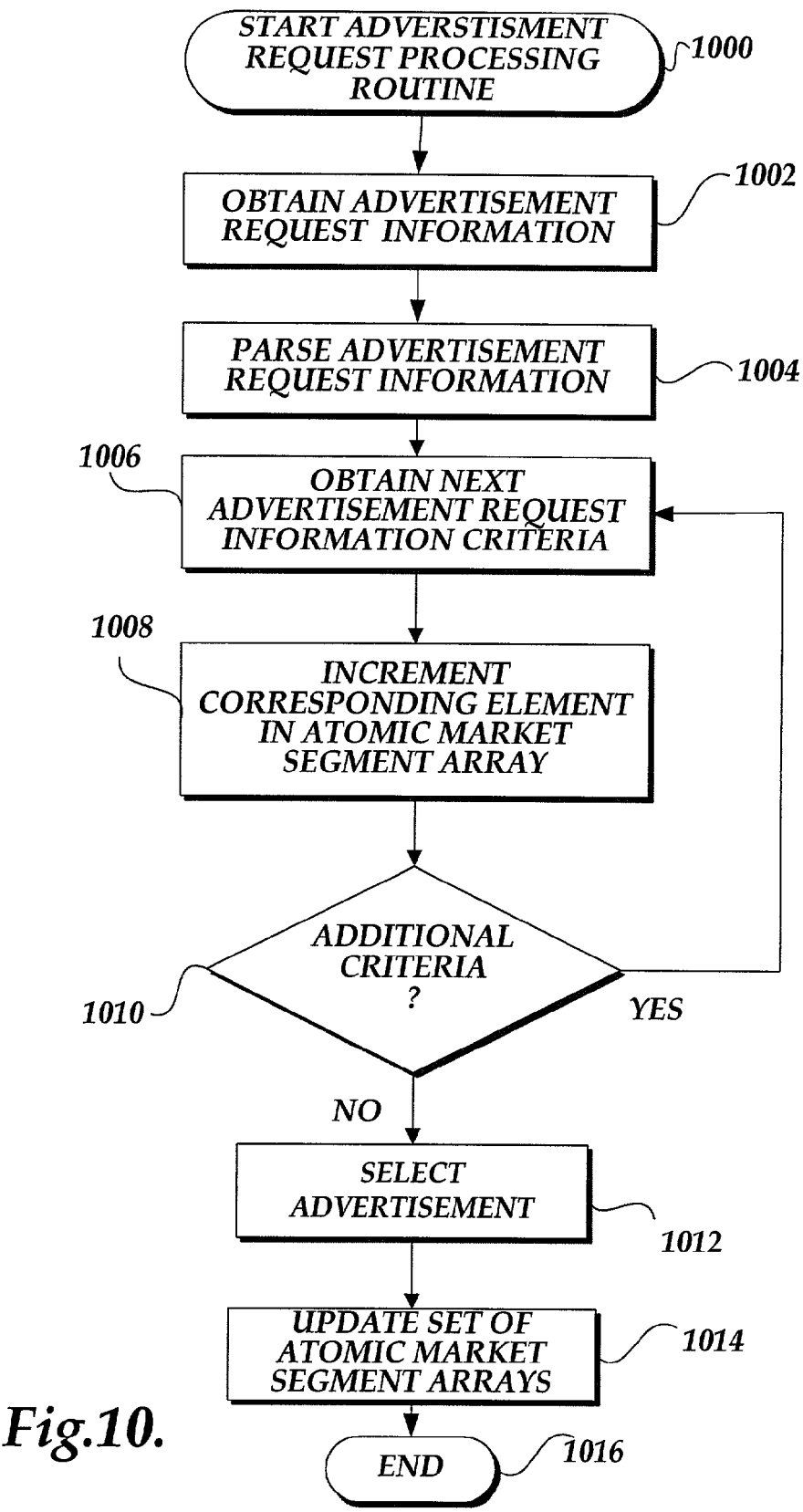
FIG. 10 is a flow diagram illustrative of an advertisement request information processing routine implemented by an advertisement processing component of an advertisement delivery system in accordance with the present invention.

FIG. 10 is a flow diagram illustrative of an advertisement request information processing routine 1000 implemented by the advertisement processing component 86 of the advertisement delivery system 78 in accordance with the present invention. At block 1002, the advertisement processing component 86 obtains the advertisement request information including advertisement request criteria. As illustrated in FIGS. 5-8, in an illustrative embodiment of the present invention, the advertisement request information is obtained by an advertisement client component 89 and transferred to a user profile component 82. The user profile component 82 includes additional user information from a user information store 84 and transfers the advertisement request information to the advertisement processing component 86.

At block 1004, the advertisement processing component 86 parses the advertisement request information to generate an ordered list of advertisement information request criterion. In actual embodiment of the present invention, the advertisement processing component 86 maintains the order of the advertisement request information criteria to match with the atomic market segment arrays. However, one skilled in the relevant art will appreciate that the advertisement delivery system 78 may process the order of the advertisement request criteria in an alternative manner, or may not take into account the order of the advertisement request information criteria.

In accordance with an illustrative embodiment of the present invention, the advertisement processing component 86 processes the parsed advertisement request information by generating multiple combinations of the parsed advertisement request information. The advertisement processing component 86 then attempts to match the combinations with the atomic market segment array data stored in the atomic market segment store 90. At block 1006, the advertisement processing component selects a first advertisement request information criterion and at block 1008 increments an array element in a corresponding atomic market segment array. At decision block 1010, a test is conducted to determine whether any additional advertisement request information criteria remain. If advertisement request information criteria remain, the process 1000 returns to block 1006. If no advertisement request information criteria remain, the process 1000 continues to block 1012, which will be explained in greater detail below.

Figure 11:
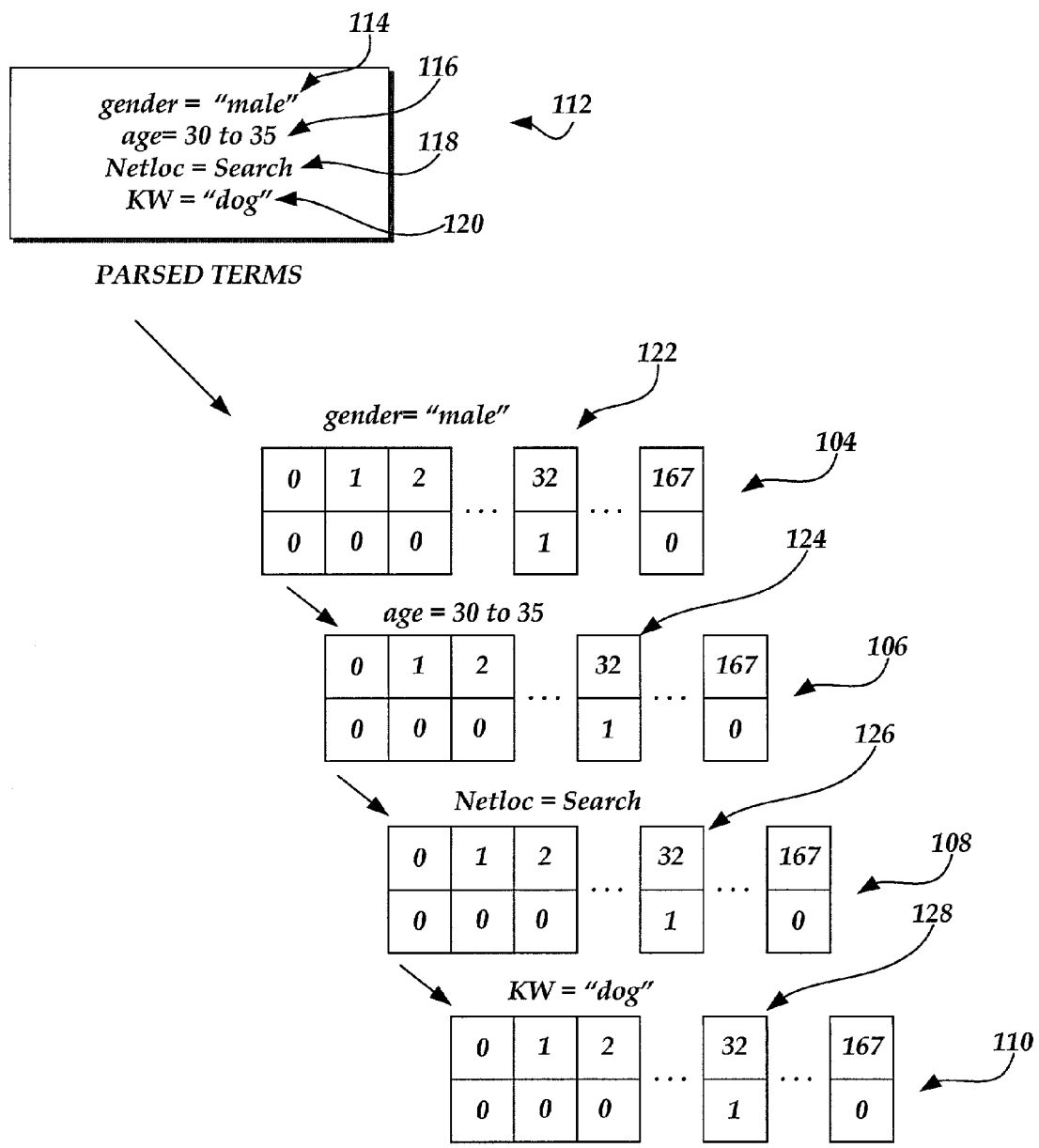
FIG. 11 is a block diagram of the atomic market segment arrays of FIG. 4 illustrating the population of array element by parsed advertisement request criteria in accordance with the present invention.

FIG. 11 is a block diagram of the atomic market segment arrays of FIG. 4 illustrating the population of array element by parsed advertisement request criteria in accordance with the present invention. As illustrated in FIG. 11, in the illustrative example, the parsed advertisement request information includes four criteria terms, namely, a "gender='male'" term 114, an "age=30 to 35" term 116, a "Netloc=Search" term 118 and a "KW='dog'" term 120. Assuming that in the illustrative example the advertisement request was received during the $32^{nd}$ hour of a monitoring period, the $32^{nd}$ array element 122 of the first atomic market array 104 would be incremented to reflect the received first advertisement request information criteria, namely, "gender='male.'" Similarly, the $32^{nd}$ array elements 124, 126, and 128 of the second, third and fourth atomic market segment arrays 106, 108, 110 would be incremented to correspond to the second, third and fourth terms 116, 118, and 120 of the parsed advertisement request information criteria.

Returning to FIG. 10, once the last advertisement request information criteria has been processed, at block 1012, an appropriate advertisement may be selected. In an illustrative embodiment of the present invention, the advertisement processing component 86 may include indicators in the atomic market segment arrays to indicate when an advertisement is ready for display. Additionally, the advertisement processing component 86 may employ additional methods and systems for selecting from a group of potentially applicable advertisements. For example, the advertisement selection process may incorporate additional functionality, such as a method and system for processing and selecting one or more advertisements, which is described in better detail in commonly-owned U.S. patent application Ser. No. 09/773,449, filed Jan. 31, 2001, referenced above, and will not be described in greater detail.

At block 1014, the advertisement processing component 86 updates the atomic market segment data according to the processed advertisement request information criteria and stores the updated data in the atomic market segment store. At block 1016, the routine 1000 terminates.

In accordance with the present invention, the advertisement manager component 92 of the advertisement delivery system 78 can utilize the populated atomic market segment data to track current advertisement campaign compliance. Additionally, the advertisement manager component 92 may utilize the populated market segment data to predict future advertisement display opportunities based on historical data. In accordance with this aspect of the present invention, the advertisement manager component 92 may utilize the atomic market segment data to predict future capacity for advertisement campaigns that have target market segments that directly match a current advertisement campaign. For example, the advertisement manager component 92 may apply a forecasting method, such as a least-square method or a linear regression method, to predict future display opportunities for different predicted volumes of advertisement requests. One skilled in the relevant art will appreciate that any one of a variety of trend analysis may be utilized to predict future trends in data points and are considered within the scope of the present invention.

In conjunction with predicting future display opportunities for advertisement campaigns having matching target markets, the advertisement manager component 92 may utilize set theory and probability theory to compute a percentage of overlaps between different target market segments in processing the populated target market segment array data. One skilled in the relevant art will appreciate that between two advertisement campaigns, the target market segments of the campaigns may either be disjoint, fully contained or intersecting. If the target market segments are disjoint, the campaigns do not share any common values for target market segment criteria. If the target market segment criteria are fully contained, then one advertisement campaign has identical target market segment criteria values as the other advertisement campaign. For example, a target market for one advertisement campaign may have a parent/child relationship with a second advertisement campaign. Additionally, the advertisement campaign has additional target market segment criteria values that do not satisfy the other advertisement campaign's target market segment criteria values. Finally, if the target market segments are intersecting, the campaigns share some portion of matching target market segment criteria values.

As applied to the present invention, in one aspect, the advertisement manager component 92 utilizes set theory and probability theory to calculate potential capacity for future advertisement campaigns not directly matching the target market segments of any current campaigns. For example, because it may not be practical for an advertisement delivery system 78 to store every possible permutation of advertisement request, the advertisement delivery system 78 utilizes set and probability theories to manage various future advertisement campaigns having evaluation criterion that are combinations of current advertisement campaign atomic market segment data. Additionally, in another aspect, the advertisement manager component 92 utilizes set theory and probability theory to reduce capacity numbers for predicted advertisement display opportunities if one or more advertisement campaigns may have some overlap in display opportunities, such as in an overlapping or fully contained market segment.

Figure 12:
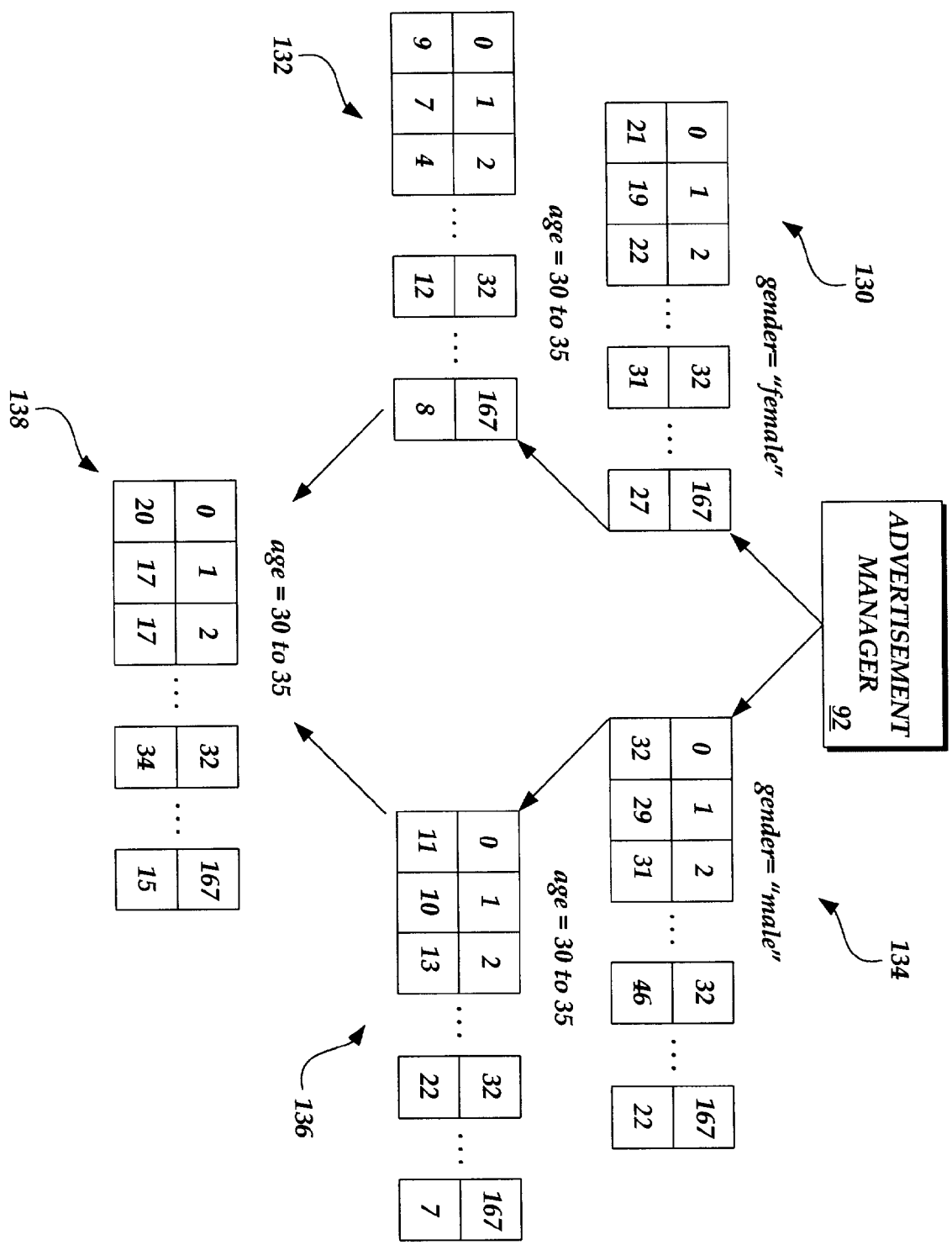
FIG. 12 is a block diagram illustrating the generation of a predicted number of advertisement display opportunities from overlapping market segments in accordance with the present invention.

FIG. 12 is a block diagram illustrating the generation of a predicted number of advertisement display opportunities from overlapping market segments in accordance with the present invention. In an illustrative example, assume that an advertisement manager 92 needs to calculate a total number of advertisement request information criteria that included the term "age=30 to 35" and that it was not a first criteria in any advertisement campaign target market segment criteria order. Accordingly, as illustrated in FIG. 12, the advertisement manager 92 obtains two sets atomic market segment arrays from the advertisement processing component 86. The first set of atomic market segment arrays includes an atomic market array 130 corresponding to "gender='female'" and an atomic market segment array 132 corresponding to "age=30 to 35." The second set of atomic market segment arrays includes an atomic market array 134 corresponding to "gender='male'" and an atomic market segment 136 corresponding to "age=30 to 35." One skilled in the relevant art will appreciate that the addition of atomic market segment array 132 and atomic market segment array 134 would yield a total number of advertisement request information criteria including the terms "age=30 to 35," as illustrated in atomic market segment array 138. Thus, the advertisement manager 92 may utilize the forecasting method to predict the total number of advertisement request information criteria that will include the term "age=30 to 35."

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for estimating appropriate advertisement inventory, the method comprising:

obtaining one or more advertisement target market segment criteria from an advertiser for delivering at least one advertisement;

utilizing a first computing process, generating a target market segment array corresponding to each of the one or more advertisement target market segment criteria wherein each target market segment array includes a plurality of array elements, each array element corresponding to a period of time;

obtaining an advertisement request from one of a user and a content provider, the advertisement request including one or more target market data elements, and the advertisement request being associated with a time increment;

upon determining that at least one of the one or more target market data elements corresponds to a particular one of the one or more advertisement target market segment criteria obtained from the advertiser, incrementing a numerical identifier in one or more of the plurality of array elements corresponding to the time increment and included in the target market segment array that corresponds to the particular one of the one or more advertisement target market segment criteria, utilizing a second computing process;

processing, utilizing a third computing process, a plurality of numerical identifiers stored in array elements corresponding to the increment of time incremented in association with the one or more target market segment arrays to determine appropriate advertisement inventory at a particular time;

providing the plurality of numerical identifiers and the one or more target market segment arrays to an advertisement processing component; and determining, using a fourth computing process, an inventory of advertisements at the processing component based on the plurality of numerical identifiers and the one or more target market segment arrays, wherein the first, second, third, and fourth computing processes are performed by one or more computing devices.

2. The method as recited in claim 1, wherein generating a target market segment array corresponding to each of the one or more advertisement target market segment criteria includes:

parsing the one or more advertisement target market segment criteria in a particular order; and generating the target market segment arrays in an order corresponding to the particular order of the one or more advertisement target market segment criteria.

3. The method as recited in claim 1, wherein the processing of the plurality of numerical identifiers includes applying a trend analysis.

4. The method as recited in claim 3, wherein the trend analysis includes a least-squared trend analysis.

5. The method as recited in claim 3, wherein the trend analysis includes a linear regression trend analysis.

6. The method as recited in claim 3, wherein the trend analysis includes a set theory trend analysis.

7. The method as recited in claim 1, wherein the at least one advertisement is from an advertisement campaign.

8. The method as recited in claim 7, wherein the one or more advertisement target market segment criteria includes user demographic information.

9. The method as recited in claim 8, wherein the user demographic information includes a user age.

10. The method as recited in claim 8, wherein the user demographic information includes a user gender.

11. The method as recited in claim 7, wherein the one or more advertisement target market segment criteria includes one or more keywords.

12. The method as recited in claim 7, wherein the one or more advertisement target market segment criteria includes an identifier of a target content provider.

13. The method as recited in claim 1, wherein the numerical identifier corresponds to the time associated with the advertisement request.

14. The method as recited in claim 13, wherein each of the plurality of array elements is representative of a 1-hour time increment.

15. A computerized advertisement delivery system embodied on one or more computer-storage media having computer-executable instructions embodied thereon for processing advertisement requests, the advertisement requests each being associated with one or more target market data elements, the system comprising:

an advertisement client component operable to obtain one or more advertisement target market segment criteria from an advertiser for delivering at least one advertisement and generating a target market segment array corresponding to each of the one or more advertisement target market segment criteria, wherein each target market segment array includes a plurality of array elements, each array element corresponding to a period of time, the advertisement client component further operable to obtain an advertisement request from one of a user and a content provider, the advertisement request including one or more target market data elements, and increment a numerical identifier in one or more of the plurality of array elements corresponding to a time associated with the advertisement request;

an advertisement processing component operable to:
(1) parse an advertisement associated with the advertisement request,
(2) increment a plurality of atomic market segment array elements indicating a time increment corresponding to a time the advertiser requested the advertisement, and
(3) estimate available advertisement inventory based on the target market segment array corresponding to each of the one or more advertisement target market segment criteria for delivering the at least one advertisement; and an advertisement manager component operable to obtain atomic market segment data by evaluating the one or more advertisement target market segment criteria using the target market segment arrays and to process the atomic market segment data for at least one of capacity planning and inventory management.

16. The system as recited in claim 15, wherein the advertisement manager component is operable to generate advertisement campaign compliance data by processing the atomic market segment data.

17. The system as recited in claim 15, wherein the at least one advertisement is from an advertisement campaign.

18. The system as recited in claim 17, wherein the one or more advertisement target market segment criteria includes user demographic information.

19. The system as recited in claim 18, wherein the user demographic information includes a user age.

20. The system as recited in claim 18, wherein the user demographic information includes a user gender.

21. The system as recited in claim 15, wherein the one or more advertisement target market segment criteria includes one or more keywords.

22. The system as recited in claim 15, wherein the one or more advertisement target market segment criteria includes an identifier of a target content provider.

23. The system as recited in claim 15, wherein the advertisement manager component is operable to generate future advertisement data and advertisement request capacity data by processing the atomic market segment data.

24. The system as recited in claim 23, wherein the advertisement manager component generates future inventory advertisement data by applying a forecasting method.

25. The system as recited in claim 24, wherein the forecasting method includes a least-squared trend analysis.

26. The system as recited in claim 24, wherein the forecasting method includes a linear regression trend analysis.

27. The system as recited in claim 24, wherein the forecasting method includes a set theory trend analysis.

28. The method as recited in claim 1, wherein the plurality of array elements includes 168 array elements.

29. One or more computer-storage media having computer-executable components embodied thereon that, when executed by a computing device, perform a method for estimating available advertisement inventory, the computer-storage medium comprising:
 a payload processing component operable to obtain one or more advertisement target market segment criteria corresponding to an advertisement request and generate one or more target market segment arrays corresponding to each advertisement target market segment criterion, wherein each target market segment array includes a plurality of array elements corresponding to periods of time, wherein the payload processing component is further operable to obtain an advertisement request associated with a time, the advertisement request including one or more target market data elements, and wherein the payload processing component is further operable to increment a numerical identifier in the plurality of array elements corresponding to the time associated with the advertisement request; and
 a payload manager, the payload manager computing a linear regression to evaluate the one or more advertisement target market segment criteria using the one or more target market segment arrays and to process data within the one or more target market segment arrays to estimate available advertisement inventory.

30. The one or more computer-storage media as recited in claim 29, wherein the advertisement request is associated with an advertisement from an advertisement campaign.

31. The one or more computer-storage media as recited in claim 29, wherein the one or more advertisement target market segment criteria includes user demographic information.

32. The one or more computer-storage media as recited in claim 31, wherein the user demographic information includes a user age.

33. The one or more computer-storage media as recited in claim 32, wherein the user demographic information includes a user gender.

34. The one or more computer-storage media as recited in claim 29, wherein the one or more advertisement target market segment criteria includes one or more keywords.

35. The one or more computer-storage media as recited in claim 29, wherein the one or more advertisement target market segment criteria includes an identifier of a target content provider.

36. The one or more computer-storage media as recited in claim 29, further comprising a user information component operable to obtain a user identifier and provide user identifier criteria to the one or more target market data elements.

37. The one or more computer-storage media as recited in claim 29, wherein each target market segment array includes 168 array elements.

38. The one or more computer-storage media as recited in claim 37, wherein each of the plurality of array elements is representative of a 1-hour time increment.

39. The one or more computer-storage media as recited in claim 29, wherein the payload manager is operable to generate future payload and request capacity data by processing data within the one or more target market segment arrays.

40. The one or more computer-storage media as recited in claim 39, wherein the payload manager generates future inventory payload data by applying a forecasting method.

41. The one or more computer-storage media as recited in claim 40, wherein the forecasting method includes a least-squared trend analysis.

42. The one or more computer-storage media as recited in claim 40, wherein the forecasting method includes a linear regression trend analysis.

43. The one or more computer-storage media as recited in claim 40, wherein the forecasting method includes a set theory trend analysis.

44. The one or more computer-storage media as recited in claim 29, wherein the payload manager is operable to generate advertisement campaign compliance data by processing data within the one or more target market segment arrays.

* * * * *